(12) United States Patent
Martens et al.

(10) Patent No.: US 11,221,632 B2
(45) Date of Patent: Jan. 11, 2022

(54) METHOD FOR CHECKING A COLLISION BETWEEN TWO DRIVERLESS TRANSPORT VEHICLES, DRIVERLESS TRANSPORT VEHICLE, AND SYSTEM HAVING A PLURALITY OF DRIVERLESS TRANSPORT VEHICLES

(71) Applicant: KUKA Deutschland GmbH, Augsburg (DE)

(72) Inventors: Moritz Martens, Augsburg (DE); Tabea Grams, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 472 days.

(21) Appl. No.: 16/307,714

(22) PCT Filed: Jun. 20, 2017

(86) PCT No.: PCT/EP2017/065083
§ 371 (c)(1),
(2) Date: Dec. 6, 2018

(87) PCT Pub. No.: WO2017/220574
PCT Pub. Date: Dec. 28, 2017

(65) Prior Publication Data
US 2019/0302800 A1    Oct. 3, 2019

(30) Foreign Application Priority Data
Jun. 22, 2016    (DE) .................... 10 2016 211 129.9

(51) Int. Cl.
*G05D 1/02* (2020.01)
*G05D 1/00* (2006.01)
(Continued)

(52) U.S. Cl.
CPC ......... *G05D 1/0289* (2013.01); *B60W 30/095* (2013.01); *G05D 1/0088* (2013.01);
(Continued)

(58) Field of Classification Search
CPC .. G05D 1/0289; G05D 1/0088; G05D 1/0212; B60W 30/095; G08G 1/166; G08G 1/20
(Continued)

(56) References Cited

U.S. PATENT DOCUMENTS

2005/0273200 A1    12/2005  Hietmann et al.
2009/0043440 A1     2/2009  Matsukawa et al.
(Continued)

FOREIGN PATENT DOCUMENTS

DE    102012008846 A1    11/2012
EP       2818954 A2      12/2014

OTHER PUBLICATIONS

International Search Report for PCT/EP2017/065083, dated Oct. 4, 2017.

*Primary Examiner* — Peter D Nolan
*Assistant Examiner* — Luke Huynh
(74) *Attorney, Agent, or Firm* — Bachman & LaPointe, P.C.

(57) ABSTRACT

The invention relates to a method for checking a collision between a driverless transport vehicle (1) and a further driverless transport vehicle during planning of a movement of at least the driverless transport vehicle (1). The invention further relates to a driverless transport vehicle (1) and to a system having a plurality of driverless transport vehicles.

16 Claims, 6 Drawing Sheets

(51) Int. Cl.
  *G08G 1/16* (2006.01)
  *G08G 1/00* (2006.01)
  *B60W 30/095* (2012.01)

(52) U.S. Cl.
  CPC .......... *G05D 1/0212* (2013.01); *G08G 1/166* (2013.01); *G08G 1/20* (2013.01); *G05D 2201/0216* (2013.01)

(58) Field of Classification Search
  USPC .......................................................... 701/25
  See application file for complete search history.

(56) References Cited

U.S. PATENT DOCUMENTS

| | | | |
|---|---|---|---|
| 2010/0256836 A1* | 10/2010 | Mudalige | G08G 1/164 701/2 |
| 2012/0306663 A1* | 12/2012 | Mudalige | G08G 1/163 340/903 |
| 2013/0060415 A1 | 3/2013 | Pfaff et al. | |
| 2013/0325210 A1* | 12/2013 | Palm | G05D 1/0289 701/2 |
| 2014/0081505 A1* | 3/2014 | Klinger | G08G 5/003 701/25 |
| 2015/0285644 A1 | 10/2015 | Pfaff et al. | |
| 2017/0113665 A1* | 4/2017 | Mudalige | G08G 1/166 |

\* cited by examiner

METHOD FOR CHECKING A COLLISION BETWEEN TWO DRIVERLESS TRANSPORT VEHICLES, DRIVERLESS TRANSPORT VEHICLE, AND SYSTEM HAVING A PLURALITY OF DRIVERLESS TRANSPORT VEHICLES

BACKGROUND

The invention relates to a method for checking a collision between two driverless transport vehicles, a driverless transport vehicle and a system having a plurality of driverless transport vehicles.

For an automatic movement of driverless transport vehicles (also referred to as: automated guided vehicle), a planning of a path can be carried out within a graph. The graph is assigned to the environment within which the driverless transport vehicle should move automatically. The determined or planned path is assigned to the route which the driverless transport vehicle is intended to travel.

EP 2 818 954 A2 discloses a method for planning a virtual track or virtual guide line along which a driverless transport vehicle should move automatically within an environment from a starting point to a destination point. The environment comprises intermediate points and route sections connecting the intermediate points, the starting point and the destination point. A graph is assigned to the surroundings, the nodes of which are assigned to the points and the edges of which are assigned to the route sections of the environment.

If a plurality of driverless transport vehicles are located in the environment, the planning of the path should also comprise an avoidance of a collision of two driverless transport vehicles.

SUMMARY

It is the object of the invention to provide an improved checking of a collision of the driverless transport vehicles with a further driverless transport vehicle within the framework of a planning of a movement of a driverless transport vehicle.

The object of the invention is solved by a method for checking a collision between a driverless transport vehicle and a further driverless transport vehicle during a planning of a movement of at least the driverless transport vehicle comprising the following process steps:
providing two-dimensional models of the driverless transport vehicles,
determining an area covered by the driverless transport vehicle which the driverless transport vehicle covers during the planned movement and
determining a further area covered by the further driverless transport vehicle, which is covered by the further driverless transport vehicle during the planned movement and checking a collision between the driverless transport vehicle and the further driverless transport vehicle by checking the two areas covered for any overlap or checking a collision between the driverless transport vehicle and the further driverless transport vehicle by checking the area covered assigned to the driverless transport vehicle for any overlap with the two-dimensional model of the further transport vehicle.

The method according to the invention is preferably executed by an external computer, in particular a so-called fleet manager. A further aspect of the invention therefore relates to a system comprising the driverless transport vehicle, the further driverless transport vehicle and a computer which is able to communicate with the driverless transport vehicles, wherein the computer is adapted to carry out the method according to the invention.

The driverless transport vehicle is, for example, a mobile robot. The driverless transport vehicle designed as a mobile robot can comprise a robot arm with a plurality of successively arranged members which are connected by means of articulations. The robot arm can, for example, be fastened to the vehicle base body. The electronic control device for moving the wheels can also be adapted to move the robot arm.

The driverless transport vehicle can preferably be configured as a holonomic or omnidirectional driverless transport vehicle. In this case, the driverless transport vehicle comprises omnidirectional wheels, preferably so-called Mecanum wheels which are activated by the electronic control device.

According to the method according to the invention, accordingly for checking the collision (collision checking) during planning, the movement of at least one driverless transport vehicle is taken into account. This movement is modelled according to the invention as the area covered which the driverless transport vehicle should cover according to the planning of its movement. Should the further driverless transport vehicle be stationary according to the planning, it is checked whether this area covered overlaps the two-dimensional model of the further driverless transport vehicle. If this is not the case, a collision-free movement of the driverless transport vehicle is then obtained. If on the other hand the two-dimensional model of the further driverless transport vehicle overlaps with the area covered, in particular the planning or the part of the planning in question is then discarded.

If the further driverless transport vehicle also moves according to the planning, the movements of both driverless transport vehicles are thus taken into account in the collision check, by checking whether the two areas covered overlap. If this is not the case, collision-free movements of both driverless transport vehicles are then obtained. If on the other hand the two areas covered overlap, in particular the planning or the part of the planning in question is then discarded.

The driverless transport vehicle should in particular move within an environment. The environment is in particular assigned a graph which has a plurality of nodes and edges connecting the nodes. The edges are assigned route sections of the environment and the nodes are assigned the two ends of the points of the environment assigned to the route sections. For the planning of the movement of the driverless transport vehicle, in particular a path is determined within the graph, which comprises a plurality of edges of the graph. This results in a route which comprises route sections assigned to the edges of the graph. The driverless transport vehicle can then automatically follow the route.

The collision checking according to the invention is then preferably part of the planning of the path, wherein those edges for which a collision is identified are discarded.

It can be provided that the driverless transport vehicles are each loaded with at least one useful load. Preferably the two-dimensional models are therefore two-dimensional models of the driverless transport vehicles loaded with the useful loads, preferably two-dimensional convex models of the driverless transport vehicles loaded with the useful loads. A subset of a Euclidean space is convex if for every two arbitrary points pertaining to the set, their connecting section always lies completely within the set. The two-dimensional convex models therefore comprise no indentations. The use of two-dimensional convex models has the advantage that it can be checked relatively efficiently automatically whether they overlap. In particular, the so-called separation theorem can be used here. It can thus be prevented that protruding parts of driverless transport vehicles or their useful load move into the indentations of other driverless transport vehicles vehicles when the identified plans are executed. Such maneuvers are in particular undesirable in cases of cumbersome and heavy useful loads.

One aspect of the present invention accordingly relates to the use of a two-dimensional convex model of a driverless transport vehicle loaded with a useful load for checking a collision with a further driverless transport vehicle or a method for checking a collision between a driverless transport vehicle and a further driverless transport vehicle for a planning of a movement of at least the driverless transport vehicle, comprising: providing a two-dimensional convex model of the driverless transport vehicle loaded with a useful load.

The two-dimensional convex model of the driverless transport vehicle loaded with the useful load can be created according to the following process steps:

determining the outline of the plan view of the driverless transport vehicle loaded with the at least one useful load and forming a convex envelope of the outline in order to obtain the two-dimensional convex model of the driverless transport vehicle loaded with the useful load.

At least a part of the useful load and/or of the driverless transport vehicle as plan view can comprise at least one circular outline. Preferably before forming the convex envelope this circular outline is approximated by its smallest enclosing square. This has advantages for a relatively efficient automated collision check.

For increased safety during the collision checking, preferably the convex envelope can be inflated by a predefined safety distance in order to obtain the two-dimensional convex model of the driverless transport vehicle loaded with the useful load.

Preferably the area covered is convex, i.e. comprises no indentations. The further area covered is preferably also convex. As a result, it can be checked relatively efficiently, in particular using the separation theorem whether the two convex areas covered overlap.

The planned movement of the driverless transport vehicle is, for example, a turning of the driverless transport vehicle on the spot. In this case, the area covered is preferably executed as the smallest circumscribed circle of the two-dimensional model. A circle is also convex so that the area covered executed as a circumscribed circle is also convex.

The planned movement of the driverless transport vehicle can run along a route section. In this case, preferably for the area covered, the planned orientations of the driverless transport vehicle are taken into account at both ends of the route section.

The area covered can also be dependent on the type of planned movement along the route section. Examples of the type of movement along the route section are as follows: the driverless transport vehicle should move along a virtual guide line. The driverless transport vehicle should move autonomously along the route section.

The area covered by the driverless transport vehicle can, for example, be the circumscribed circle of the two-dimensional models at both ends of the route section. This area covered is convex and allows a relatively rapid and efficient collision check.

The area covered by the driverless transport vehicle can, for example, be the axially parallel enclosing rectangle of the two-dimensional models at both ends of the route section. This area covered is also convex. This area covered specifically models the movement of the driverless transport vehicle more accurately than the circumscribed circle but results in a somewhat higher computing expenditure for the collision checking.

If, for example, the driverless transport vehicle should drive autonomously along the route section, the area covered can be the combination of the occupied area of the two-dimensional models at both ends of the route section. This area covered is certainly not convex but its two components can preferably be executed as convex.

The area covered by the driverless transport vehicle can, for example, be a convex envelope which encloses the two-dimensional models at both ends of the route section. This modeling of the area covered is particularly suitable when the orientations of the driverless transport vehicle at both ends of the route section should remain the same and when in particular, the driverless transport vehicle should move along the virtual guide line.

The area covered by the driverless transport vehicle can, for example, comprise the circumscribed circles of the two-dimensional models of the driverless transport vehicle at both ends of the route section, wherein the area covered is the convex envelope of these two circumscribed circles. This model is particularly suitable when the orientations of the driverless transport vehicle at both ends of the route section should differ and when in particular the driverless transport vehicle should move along the virtual guide line.

According to one embodiment of the method according to the invention, it is provided that the collision checking is carried out by means of a plurality of hierarchical steps. In this case, in particular the area covered in a following step is executed more accurately compared to its preceding step but is more CPU-intensive for checking the overlap. Preferably the following step is only executed when, as a result of its preceding step, the area covered by the driverless transport vehicle assigned to the preceding step overlaps the further area covered assigned to the preceding step, should the further driverless transport vehicle also move, or overlaps the two-dimensional model of the further transport vehicle in the case where the further driverless transport vehicle is stationary.

Since the preceding step is executed computationally more efficiently, it can optionally be identified relatively rapidly that the planned movement in question can be executed free from collision.

For example, a first, a second, and a third hierarchical step can be provided. In this case, it can preferably be provided that the area covered of the first step is the circumscribed circle of the two-dimensional models at the two ends of the route section and the area covered of the second step is the axially parallel enclosing rectangle of the two-dimensional models at both ends of the route section. In particular, the circumscribed circle as the area covered allows a relative computationally efficient checking of the overlap.

The third step preferably forms the last step. For this step in particular the area covered is dependent on the type of planned movement. The area covered of the third step is, for example, the combination of the occupied area of the two-dimensional models at both ends of the route section or the convex envelope, which encloses the two-dimensional models at both ends of the route section or comprises the circumscribed circles of the two-dimensional models of the driverless transport vehicle at the two ends of the route section, wherein the area covered is the convex envelope of these two circumscribed circles.

BRIEF DESCRIPTION OF THE DRAWINGS

Exemplary embodiments of the invention are shown as an example in the appended schematic figures. In the figures.

DETAILED DESCRIPTION

Figure 1:
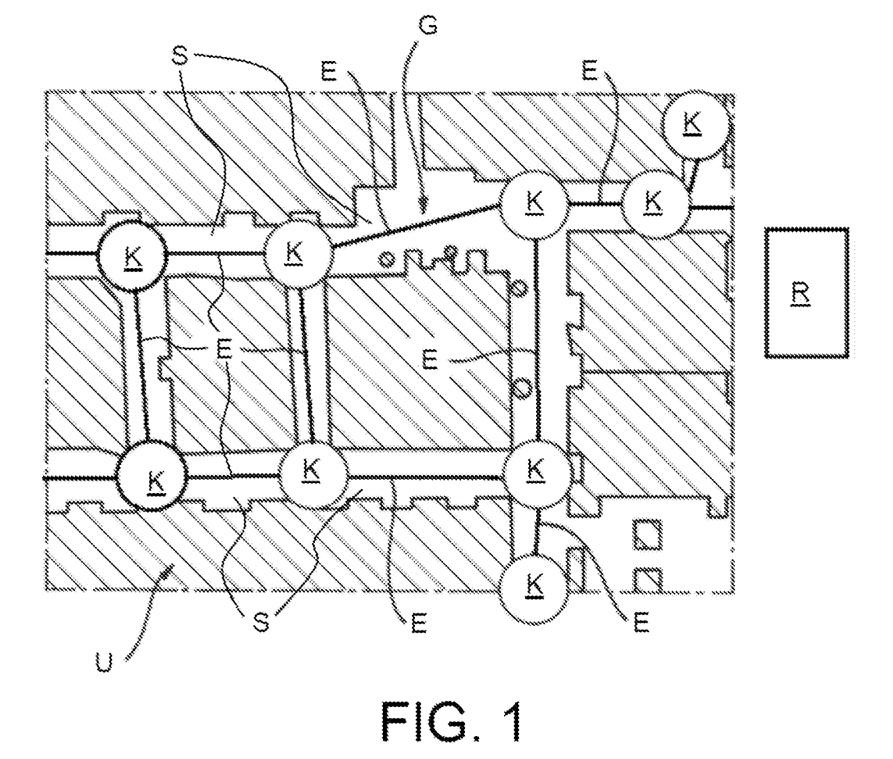
FIG. 1 shows an environment and a graph assigned to the environment.

FIG. 1 shows an environment U and a graph G assigned to the environment U. The graph G is, for example, stored in a central computer R and models the environment U. The computer R is in particular a so-called fleet manager.

The graph G comprises nodes K and edges E connecting the nodes K. The environment U comprises in particular points and route sections S connecting the intermediate points. The edges E are assigned to the route sections S and the nodes K are assigned to the points.

A plurality of driverless transport vehicles should move within the environment U. One of the driverless transport vehicles 1 is shown in FIG. 2.

Figure 2:
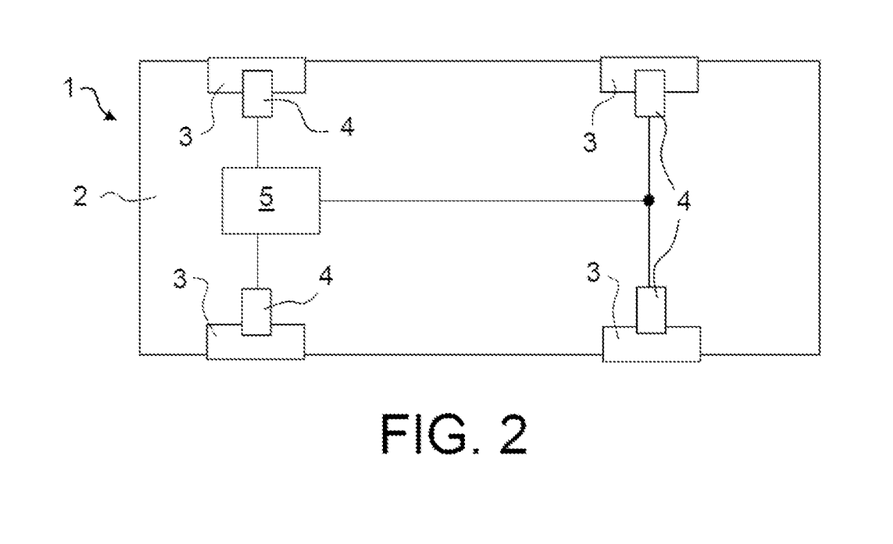
FIG. 2 shows a driverless transport vehicle.

The driverless transport vehicle 1 shown schematically in FIG. 2 is preferably configured in such a manner that it can move freely in all directions. The driverless transport vehicle 1 is in particular configured as an omnidirectionally movable or holonomic driverless transport vehicle 1. The driverless transport vehicle 1 can be a mobile robot, which comprises a robot arm having a plurality of successively arranged members, which are connected by means of articulations.

In the case of the present exemplary embodiment, the driverless transport vehicle 1 comprises a vehicle main body 2 and a plurality of omnidirectional wheels 3, which are also designated as mecanum wheels. Such wheels comprise, for example a rotatably mounted rim, on which a plurality of rolling bodies are mounted in a driveless manner. The rim can be driven by a drive. In the case of the present exemplary embodiment, the wheels 3 are each driven by an electric drive 4. These are preferably regulated electric drives.

The driverless transport vehicle 1 further comprises an electronic control device 5 arranged on the vehicle main body 2, which electronic control device 5 is connected to the drives 4. Optionally these can also activate the movement of the robot arm, if present.

The driverless transport vehicle 1 is provided to move automatically within the environment U in particular from one of the points to a further point and thus to pass at least one of the route sections S. To this end, a computer program runs on the electronic control device 5, which computer program activates the drives 4 in such a manner that these automatically move the driverless transport vehicle 1.

In the case of the present exemplary embodiment, that route along which the driverless transport vehicles should drive is planned by the computer R. To this end, a computer program runs on the computer R, which computer program initially plans paths within the graph G, which are assigned to the corresponding route sections S, along which the driverless transport vehicles should drive. In order that the individual driverless transport vehicles receive the information relevant for them from the computer R, the computer R and the driverless transport vehicles or the electronic control devices thereof are adapted so that they can communicate with one another.

In the case of the present exemplary embodiment, it is provided that when planning the paths, the computer R also takes into account potential collisions of two driverless transport vehicles 1 or plans the paths in such a manner that collisions of two driverless transport vehicles 1 are avoided. To this end, in the case of the present exemplary embodiment, the driverless transport vehicles 1 are modeled as areas which at least approximately model a plan view of the outlines of the individual driverless transport vehicles 1. The corresponding two-dimensional models or areas of the driverless transport vehicles 1 are, for example stored in the computer R or are currently calculated.

In the case of the present exemplary embodiment, the driverless transport vehicles 1 are provided to transport at least one useful load. The useful load can, for example, project beyond the corresponding driverless transport vehicle 1.

In the case of the present exemplary embodiment, when modeling the driverless transport vehicles 1, the transported useful load thereof is also taken into account.

FIGS. 3 to 7 illustrate an example as to how the driverless transport vehicle 1 with transported useful load can be modeled.

Figure 3:
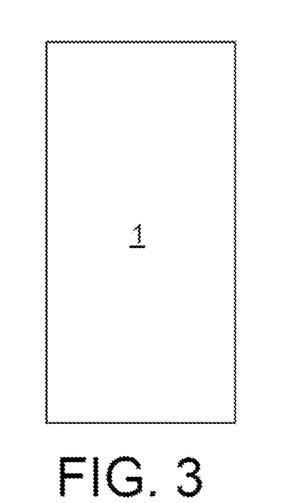
FIGS. 3-7 show the modeling of a two-dimensional model of the driverless transport vehicle with transported useful load.

FIG. 3 shows a plan view of the driverless transport vehicle 1 or its outline. The outline corresponds in the case of the present exemplary embodiment, substantially to a rectangle. Any information relating to the outlines of the driverless transport vehicles 1 is, for example, stored in a database, which the computer R may access.

Figure 4:
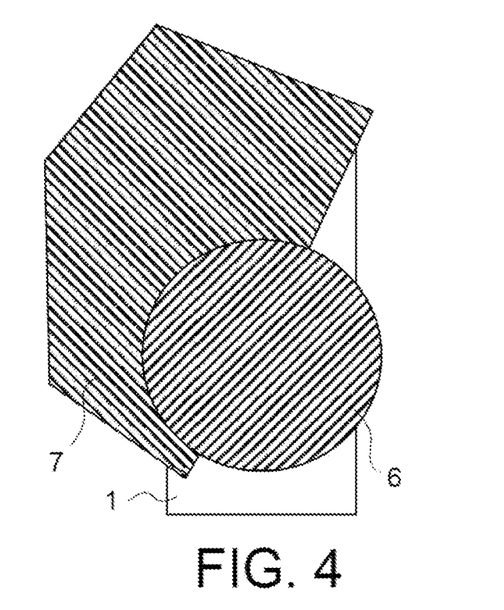

Furthermore, in the case of the present exemplary embodiment, the outlines or any information relating to the outlines of possibly provided useful loads is also stored in the database. Thus, for example, FIG. 4 shows a plan view or the outlines of a circular useful load 6 and an angular useful load 7, with which the driverless transport vehicle 1 is loaded and which each project beyond the driverless transport vehicle 1.

Figure 5:
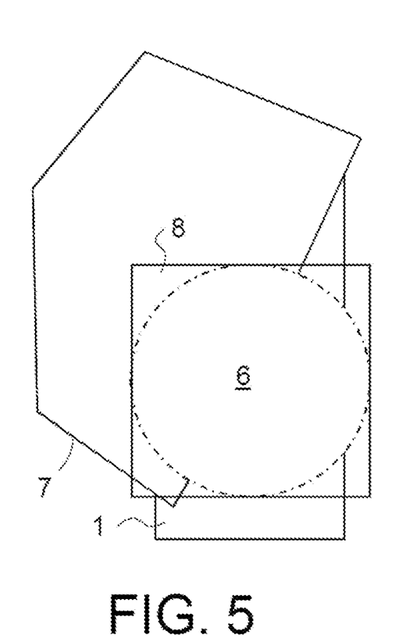

In the case of the present exemplary embodiment, not the precise outline of the driverless transport vehicle 1 loaded with the useful loads 6, 7 is used for the modeling but, for example, for reasons of increasing the efficiency for a collision checking, all circular outlines are approximated by the smallest square 8 enclosing them. This is shown in FIG. 5.

Figure 6:
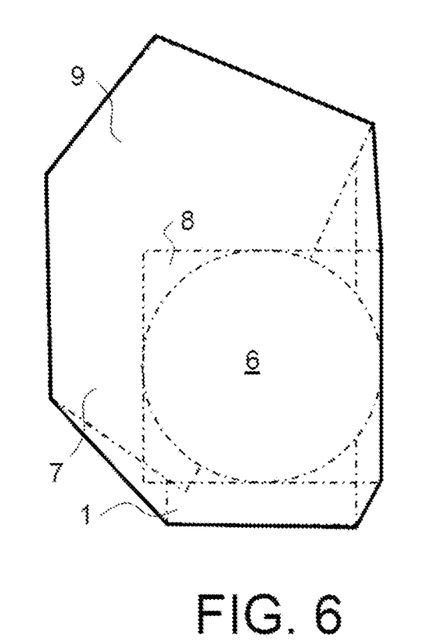

From the thus resulting outlines in the case of the present exemplary embodiment, a so-called (two-dimensional) convex envelope 9 shown in FIG. 6 is formed. In mathematics or informatics, a convex envelope is understood as the smallest convex set, which contains the initial set. A subset of a Euclidean space is then convex if for every two arbitrary points pertaining to the set, their connecting section also always lies completely within the set. The convex envelope therefore comprises no indentations.

Figure 7:
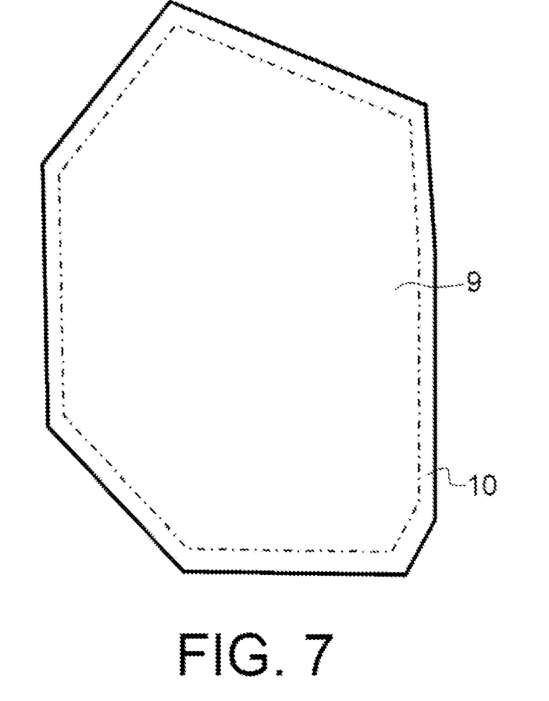

For an improved collision avoidance or collision check, the convex envelope 9 modeling the loaded driverless transport vehicle 1, which convex envelope 9 is shown by the dashed line in FIG. 7 is subsequently extended or inflated by a safety distance or parametrizable distance, with the result that the two-dimensional convex model 10 of the loaded driverless transport vehicle 1 shown in FIG. 7 is formed. The two-dimensional convex model 10 is also convex, i.e. the two-dimensional convex model 10 is also a convex area or a convex polygon or a convex form. The two-dimensional convex model 10 therefore also has no indentations.

The reasons for the use of the convex envelope 9 or the two-dimensional convex model 10 instead of a form which models the loaded driverless transport vehicle 1 more accurately, which is usually not convex, can inter alia be the following: it could not be desirable that a so-called fleet manager, i.e. the computer R, plans paths in which the loaded driverless transport vehicles 1 move so that projecting components of the driverless transport vehicle or the useful loads 6, 7 move in free spaces, which are possibly obtained between other driverless transport vehicles 1 and their useful loads 6, 7. This risk is at least reduced, if not completely eliminated, by using the convex envelope 9 or the two-dimensional convex models 10. Secondly, as a result, the so-called separation theorem can be used for a collision check.

In the case of the present exemplary embodiment, a possible collision of two driverless transport vehicles 1 is checked during the planning of the path. In this case, the movement of at least one of the two driverless transport vehicles 1 is taken into account or modeled by determining the area covered, which is at least occupied by the loaded driverless transport vehicle 1 during a movement. The area covered is obtained, for example, if the driverless transport vehicle 1 turns on the spot. The area covered is primarily that area covered by the driverless transport vehicle 1 according to the planning of the corresponding path along a determined route section S, to which two adjacent nodes K and the appurtenant edge E of the graph G are assigned.

The area covered is in particular also convex, and therefore also comprises no indentations.

Finally it is checked whether this area covered overlaps a further area covered, which is assigned to a further driverless transport vehicle 1. The further driverless transport vehicle 1 can in this case also move or even stand still. If the two areas covered do not overlap, the loaded driverless transport vehicle 1 can pass this route section S free from collision or turn on the spot and the corresponding route section S or the corresponding turning can be used for planning the path. If the further driverless transport vehicle is stationary, its area covered then corresponds to its two-dimensional convex model.

For determining the area covered, in particular the potentially planned orientations of the driverless transport vehicle 1 at both ends of the route section S or the nodes K of the corresponding edge E are taken into account.

For determining the area covered by the driverless transport vehicle 1, in the case of the present exemplary embodiment, the potential positions and orientations of the driverless transport vehicle 1 are simulated using its two-dimensional convex model 10 at both ends of the route section S in question by simulating the corresponding orientations at the nodes K of the graph G, which are assigned to both ends of the route section S in question. The area covered is obtained, for example, by a calculation of a convex envelope enclosing the two two-dimensional convex models 10.

In the case of the present exemplary embodiment, the checking of a potential collision is carried out via a plurality of steps, i.e. there is a hierarchy of heuristics for the collision checking.

In the case of the present exemplary embodiment, in a first step the areas covered are approximated by relatively simple geometric forms. For checking a potential collision, checking routines between convex polygons or convex forms and between convex polygons or forms and circles are implemented on the computer R. In so doing, emphasis is placed on the most efficient possible implementation. These implementations are based in particular on the separation theorem. The separation theorem allows in many cases the absence of an intersection, i.e. of an overlap of convex geometric forms to be identified relatively prematurely.

This relatively simple geometric form includes the entire area covered, which would be covered by the driverless transport vehicle 1 in question during passage through the route section S in question or when turning on the spot. In the first step, the area covered is selected relatively inaccurately but relatively efficiently for an automated check.

In the case of the present exemplary embodiment, the collision check using a relatively accurate modeled area covered is preceded by two steps or heuristics, which checks with relatively low expenditure and in many cases can also already indicate the absence of intersections or a collision-free potential movement.

Figure 8:
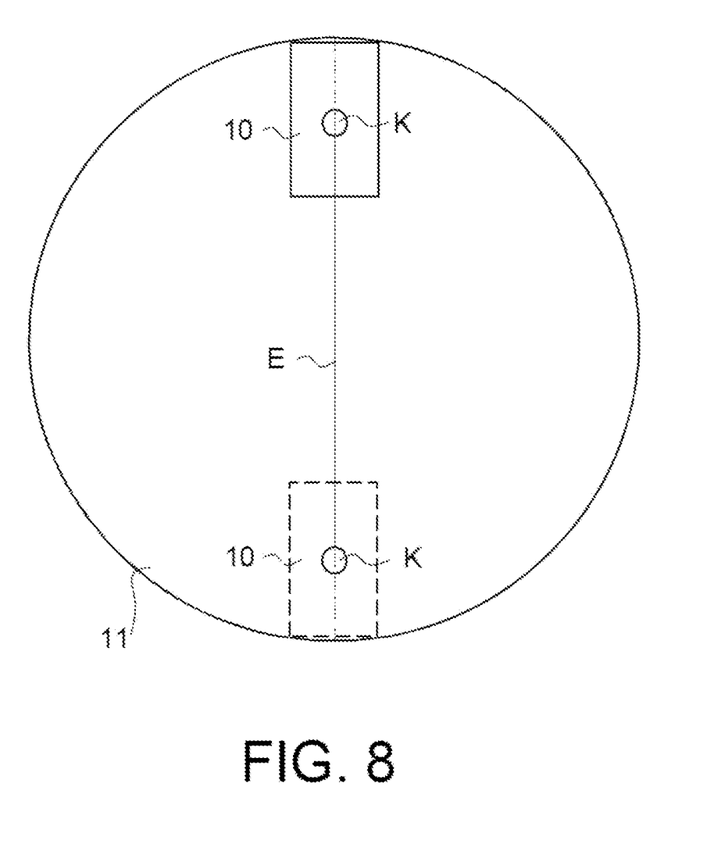
FIG. 8 shows a circumscribed circle as area covered by a driverless transport vehicle moving along a route section.

In the case of the present exemplary embodiment, initially in a first step the circumscribed circles 11, see FIG. 8, of at least one of the driverless transport vehicles 1 to be checked are determined as areas covered and checked for any overlap. Should an overlap be identified, in a second step, see FIG. 9, the respective axially parallel minimal enclosing rectangles 12 are checked for intersection. Both checks can be implemented relatively efficiently and in the absence of an intersection already eliminate any intersection of the more precisely modeled areas covered.

If an overlap is obtained for the first step, the overlap of the second step is then checked. If an overlap is again obtained, then in a third and last step the overlap is checked based on the more accurately modeled form of the areas covered. If an overlap is again obtained, the movement in question cannot be implemented and is discarded for the planning of the path in question.

In the first step, therefore in the case of the present exemplary embodiment, the areas potentially covered by the driverless transport vehicles 1 are formed by means of the circumscribed circles 11. To this end, for the driverless transport vehicles 1 in question and the route sections S in question or the assigned edges E, the orientations of the driverless transport vehicle 1 are simulated using its convex two-dimensional model 10 at both ends of the route section S in question by simulating the corresponding orientations at the nodes K of the graph G, which are assigned to both ends of the route section S in question.

In FIG. 8 one of the convex two-dimensional models 10 of the driverless transport vehicle 1 is shown by dashed lines at one of the nodes K. The simulated movement of the driverless transport vehicle is such that it should move from the node K, at which the two-dimensional convex model 10 is shown by dashed lines, to the other node K, at which the two-dimensional convex model 10 is shown by continuous lines. The circumscribed circle 11 as the area covered of the first step encloses the two two-dimensional convex models 10 at both nodes K.

Figure 10:
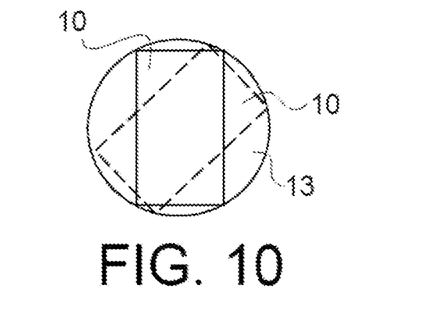
FIG. 10 shows a circumscribed circle as area covered by a turning driverless transport vehicle.

FIG. 10 shows an example of a driverless transport vehicle 1 turning on the spot with corresponding smallest circumscribed circle 13 as area covered.

Figure 9:
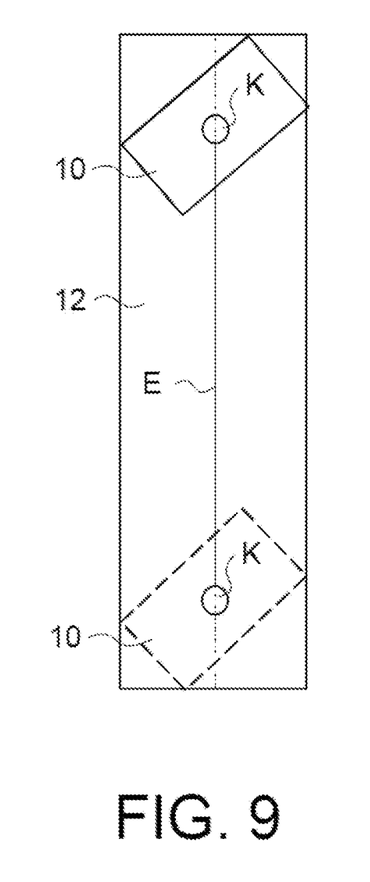
FIG. 9 shows an enclosing rectangle as area covered by a driverless transport vehicle moving along a route section.

In the second step in the case of the present exemplary embodiment, the areas potentially covered by the driverless transport vehicles 1 are formed by means of the enclosing axially parallel rectangle 12. To this end, for the driverless transport vehicle 1 and the route section S in question of the assigned edge E, the orientations of the driverless transport vehicle 1 are simulated using its two-dimensional convex model 10 at both ends of the route section S in question by simulating the corresponding orientations at the nodes K of the graph G, which are assigned to both ends of the route section S in question. In FIG. 9 one of the two-dimensional convex models 10 of the driverless transport vehicle 1 is shown by dashed lines at one of the nodes K. The simulated movement of the driverless transport vehicle 1 is such that it should move from the node K, at which the two-dimensional convex model 10 is shown by dashed lines, to the other node K at which the convex two-dimensional model 10 is shown by continuous lines. The enclosing axially parallel rectangle 12 as the area covered of the second step encloses the two two-dimensional convex models 10 at both nodes K.

In the case of the present exemplary embodiment, the form of the area covered in particular of the third step can also depend on the type of a potential movement. Thus, for example, it can be provided that the driverless transport vehicle 1 should travel along a determined route section S along a virtual guide line. However, it can also be provided that the driverless transport vehicle 1 should autonomously travel a determined route section S, e.g. by evaluating images of the environment U.

Figure 11:
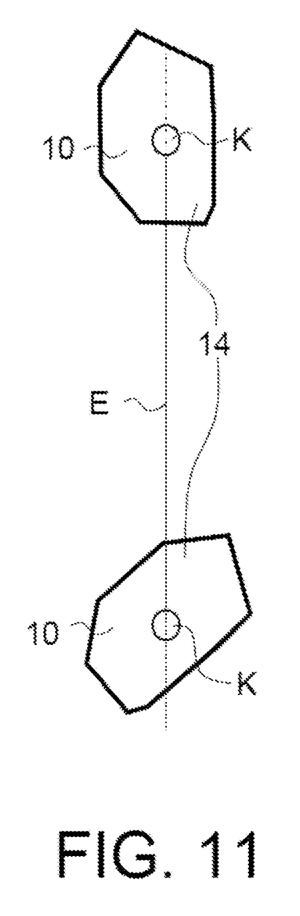
FIGS. 11-13 show examples of areas covered by the driverless transport vehicle.
Figure 12:
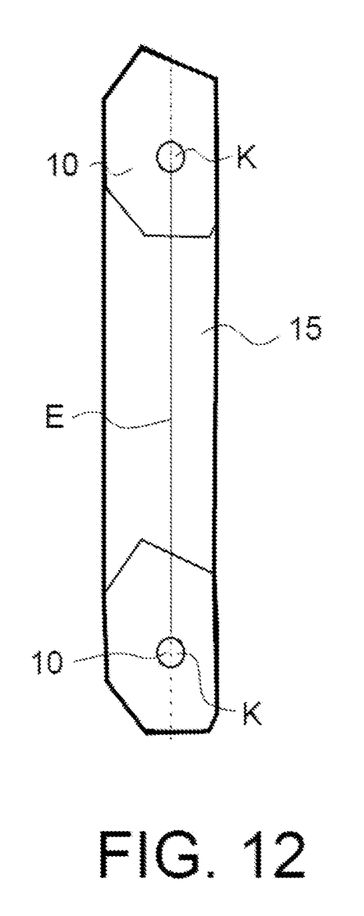
Figure 13:
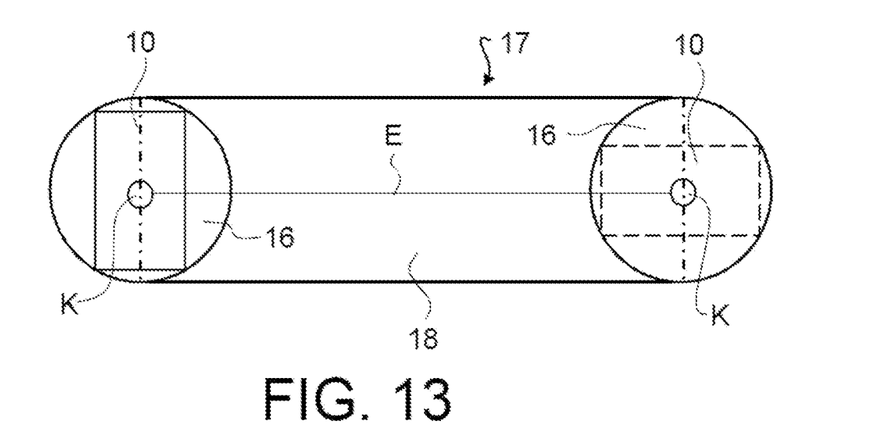

FIGS. 11 to 13 show a few examples of areas covered for the third step.

FIG. 11 shows an area covered 14 during a potential autonomous movement of the driverless transport vehicle 1 along a determined route section S. In this case, only the occupied area at the beginning of the movement and the occupied area at the end of the movement along the route section S in question are used as area covered 14, i.e. the area covered 14 is the combination of the two-dimensional convex models 10 at the nodes K, which are assigned to the route section S in question. In this case therefore, only the planning form, i.e. the two-dimensional convex model 10 of the driverless transport vehicle 1 is taken into account at the two nodes K. In particular, the collision checking is carried out separately for the two two-dimensional convex models at both ends of the route section in question.

FIG. 12 shows an example of a simulated movement of the driverless transport vehicle 1, e.g., along a virtual guide line. The orientations of the driverless transport vehicle 1 are the same at both ends of the route section S in question or at both nodes in question. The driverless transport vehicle 1 should therefore not change its orientation during the movement. In this case, the area covered is a further convex envelope 15, which encloses the two-dimensional convex models 10 at both nodes K, which are assigned to the route section S in question.

FIG. 13 shows an example of a simulated movement of the driverless transport vehicle 1, e.g., along a virtual guide line. The orientations of the driverless transport vehicle 1 are different at both ends of the route section S in question or at the two nodes in question. The driverless transport vehicle 1 should therefore change its orientation during the movement. In this case, e.g. for determining the area covered, firstly the circumscribed circles 16 of the two-dimensional convex models 10 are determined at the two nodes K in question and then a convex envelope 17 is determined as area covered, which convex envelope 17 encloses the circumscribed circles 16 at the two nodes K, which are assigned to the route section S in question. In particular, the convex envelope 17 encloses the two circumscribed circles 16 and a rectangle 18 with four sides. In each case, two of the sides are opposite so that the rectangle 18 has two pairs of sides, which each comprise two of the opposite sides. The lengths of the sides of one pair of sides correspond to the lengths of the edge E in question and the lengths of the sides of the other pair of sides correspond to the diameters of the circumscribed circles 16 in question. The sides of one of the pairs of sides run through the node K.

The collision checking can be carried out in particular by using the two circumscribed circles 16 individually, and separately the rectangle 18 instead of the complete convex envelope 17.

In this way, it can be ensured in particular that the different properties of different types of movements are suitably taken into account.

The form used to calculate the area covered in question is in particular dependent on the orientation at the beginning of the movement along an edge E and a planned orientation at the end of the movement. If both orientations agree, preferably for the third step, precisely the area which is covered by the planning form, i.e. the two-dimensional convex model 10, in the case of the present exemplary embodiment, of the loaded driverless transport vehicle 1 while maintaining this orientation is taken into account. This results in a convex polygon, i.e. the convex envelope 15, which is essential for the use of the preferably used separation theorem.

Otherwise, for example, account is taken of the area covered, which is covered by the circumscribed circle 16 of the planning form of the driverless transport vehicle 1 when this circumscribed circle 16 is moved from one of the nodes K to the other node K of the corresponding edge E. This in turn yields a convex form, i.e. the convex envelope 17.

Furthermore, at least the risk that two driverless transport vehicles 1 traveling past one another turn past too close to one another can be at least reduced by preferably taking into account exclusively convex forms.

One of the driverless transport vehicles can also be stationary for the collision checking or turn on the spot.

In this way, both the movement along the edge E or the corresponding route section S can be taken into account as well as the planned orientation.

The invention claimed is:

1. A method for operating a system, the system comprising a computer, a driverless transport vehicle (1) and a further driverless transport vehicle, wherein the method comprises checking for collision between the driverless transport vehicle (1) and the further driverless transport vehicle during a planning of a movement of at least the driverless transport vehicle (1) by:
    providing respective two-dimensional models of the driverless transport vehicle (1) and the further driverless transport vehicle;
    the computer determining an area covered by the driverless transport vehicle (1) which the driverless transport vehicle (1) covers during the planned movement; and
    the computer determining a further area covered by the further driverless transport vehicle, which is covered by the further driverless transport vehicle during the planned movement and checking a collision between the driverless transport vehicle (1) and the further driverless transport vehicle by checking the two areas covered for any overlap or checking a collision between the driverless transport vehicle (1) and the further driverless transport vehicle by checking the determined area covered by the driverless transport vehicle (1) for any overlap with the two-dimensional model of the further driverless transport vehicle, wherein:

the checking of the collision is carried out by the computer via a plurality of hierarchical steps, wherein the area covered in a following step is executed more accurately compared to its preceding step but is more CPU-intensive for checking the overlap and the following step is only executed when, as a result of its preceding step, the area covered by the driverless transport vehicle (1) determined in the preceding step overlaps the further area covered determined in the preceding step or overlaps the two-dimensional model of the further transport vehicle; and the computer communicates to the driverless transport vehicle (1) the planned movement.

2. The method as claimed in claim 1, comprising: discarding the planning or the part of the planning in question when the two-dimensional model of the further driverless transport vehicle overlaps with the area covered or discarding the planning or the part of the planning in question when the two areas covered overlap.

3. The method as claimed in claim 1, in which the driverless transport vehicle (1) and the further driverless transport vehicle are each loaded with at least one useful load (6, 7) and the two-dimensional models are two-dimensional convex models of the driverless transport vehicle (1) and the further driverless transport vehicle loaded with the useful loads (6, 7).

4. The method as claimed in claim 3, in which the two-dimensional convex model of the driverless transport vehicle (1) loaded with the useful load (6, 7) is created according to the following process steps:

determining the outline of the plan view of the driverless transport vehicle (1) loaded with the at least one useful load (6, 7) and forming a convex envelope (9) of the outline in order to obtain the two-dimensional convex model of the driverless transport vehicle (1) loaded with the useful load (6, 7).

5. The method as claimed in claim 4 in which at least a part of the useful load (6) and/or of the driverless transport vehicle (1) as plan view comprises at least one circular outline and before forming the convex envelope (9) the circular outline is approximated by its smallest enclosing square (8).

6. The method as claimed in claim 4 comprising: inflating the convex envelope (9) by a predefined safety distance in order to obtain the two-dimensional convex model (10) of the driverless transport vehicle (1).

7. The method as claimed in claim 1, in which the area covered is convex.

8. The method as claimed in claim 1, in which the planned movement of the driverless transport vehicle (1) is a turning of the driverless transport vehicle (1) on the spot and the area covered is the smallest circumscribed circle (13) of the two-dimensional model.

9. The method as claimed in claim 1, in which the planned movement of the driverless transport vehicle (1) runs along a route section (S).

10. The method as claimed in claim 9, in which for the area covered the planned orientations of the driverless transport vehicle (1) are taken into account at both ends of the route section (S) and/or in which the area covered is dependent on the type of planned movement.

11. The method as claimed in claim 9, in which the area covered by the driverless transport vehicle (1)

is the circumscribed circle (11) of the two-dimensional models at both ends of the route section (S) or is the axially parallel enclosing rectangle (12) of the two-dimensional models at both ends of the route section (S) or is the sum of the occupied area of the two-dimensional models at both ends of the route section (S) or is a convex envelope (15) which encloses the two-dimensional models at both ends of the route section (S) or comprises the circumscribed circles (16) of the two-dimensional models of the driverless transport vehicle (1) at both ends of the route section (S) and the area covered is the convex envelope (17) of these two circumscribed circles (16).

12. The method as claimed in claim 1, wherein the computer communicates with the driverless transport vehicle (1) to proceed with the planned movement.

13. The method as claimed in claim 12, comprising a first, a second and a third hierarchical step, wherein in particular the area covered of the first step is the circumscribed circle (11) of the two-dimensional models at the two ends of the route section (S) and the area covered of the second step is the axially parallel enclosing rectangle (12) of the two-dimensional models at both ends of the route section (S).

14. A system, comprising a driverless transport vehicle (1), a further driverless transport vehicle and a computer (R) which is able to communicate with the driverless transport vehicle (1) and the further driverless transport vehicle, wherein the computer (R) is adapted to check for collision between the driverless transport vehicle (1) and the further driverless transport vehicle during a planning of a movement of at least the driverless transport vehicle (1) by:

determining an area covered by the driverless transport vehicle (1) which the driverless transport vehicle (1) covers during the planned movement; and determining a further area covered by the further driverless transport vehicle, which is covered by the further driverless transport vehicle during the planned movement and checking a collision between the driverless transport vehicle (1) and the further driverless transport vehicle by checking the two areas covered for any overlap or checking a collision between the driverless transport vehicle (1) and the further driverless transport vehicle by checking the area covered assigned to the driverless transport vehicle (1) for any overlap with a two-dimensional model of the further driverless transport vehicle, wherein:

the checking of the collision is carried out by the computer via a plurality of hierarchical steps, wherein the area covered in a following step is executed more accurately compared to its preceding step but is more CPU-intensive for checking the overlap and the following step is only executed when, as a result of its preceding step, the area covered by the driverless transport vehicle (1) determined in the preceding step overlaps the further area covered determined in the preceding step or overlaps the two-dimensional model of the further transport vehicle; and the computer is configured to communicate with the driverless transport vehicle (1) to proceed with the planned movement.

15. A method for operating a system, the system comprising a computer, a driverless transport vehicle (1) and a further driverless transport vehicle, wherein the method comprises checking for collision between the driverless transport vehicle (1) and the further driverless transport vehicle during a planning of a movement of at least the driverless transport vehicle (1) by:
- providing respective two-dimensional models of the driverless transport vehicle (1) and the further driverless transport vehicle,
- the computer determining an area covered by the driverless transport vehicle (1) which the driverless transport vehicle (1) covers during the planned movement, the planned movement of the driverless transport vehicle (1) running along a route section (S) in which for the area covered the planned orientations of the driverless transport vehicle (1) are taken into account at both ends of the route section (S);
- the computer determining a further area covered by the further driverless transport vehicle, which is covered by the further driverless transport vehicle during the planned movement and checking a collision between the driverless transport vehicle (1) and the further driverless transport vehicle by checking the two areas covered for any overlap or checking a collision between the driverless transport vehicle (1) and the further driverless transport vehicle by checking the area covered assigned to the driverless transport vehicle (1) for any overlap with the two-dimensional model of the further driverless transport vehicle; and
- the computer communicating to the driverless transport vehicle (1) the planned movement.

16. The method of claim 15 comprising the computer communicating to the driverless transport vehicle to proceed with the planned movement.

\* \* \* \* \*